United States Patent
Yamamichi

(10) Patent No.: US 10,576,555 B2
(45) Date of Patent: Mar. 3, 2020

(54) CUTTING INSERT, CUTTING TOOL, AND METHOD FOR MANUFACTURING A CUT WORKPIECE

(71) Applicant: KYOCERA Corporation, Kyoto-shi, Kyoto (JP)

(72) Inventor: Kazuki Yamamichi, Omihachiman (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/196,930

(22) Filed: Nov. 20, 2018

(65) Prior Publication Data

US 2019/0084060 A1   Mar. 21, 2019

Related U.S. Application Data

(63) Continuation of application No. 14/900,058, filed as application No. PCT/JP2014/066603 on Jun. 24, 2014, now Pat. No. 10,160,047.

(30) Foreign Application Priority Data

Jun. 27, 2013   (JP) .................................. 2013-134716
Nov. 8, 2013    (JP) .................................. 2013-231827

(51) Int. Cl.
    *B23B 27/14*    (2006.01)
    *B23C 5/20*     (2006.01)
    *B23C 5/06*     (2006.01)

(52) U.S. Cl.
    CPC ............... *B23C 5/207* (2013.01); *B23C 5/06* (2013.01); *B23C 2200/0455* (2013.01);
    (Continued)

(58) Field of Classification Search
    CPC ...... B23C 2200/0455; B23C 2200/201; B23C 2200/366; B23C 5/06; B23C 2200/203;
    (Continued)

(56) References Cited

U.S. PATENT DOCUMENTS

| 4,294,566 A | 10/1981 | Boone |
| 5,203,649 A | 4/1993 | Katbi et al. |

(Continued)

FOREIGN PATENT DOCUMENTS

| JP | 09-225724 A | 9/1997 |
| JP | 10-100015 A | 4/1998 |

(Continued)

OTHER PUBLICATIONS

Office Action dated Jan. 31, 2017 issued by the Japan Patent Office in counterpart Japanese Patent Application No. 2015-524044.

(Continued)

*Primary Examiner* — Sara Addisu
(74) *Attorney, Agent, or Firm* — Procopio Cory Hargreaves and Savitch LLP

(57) ABSTRACT

This cutting insert is provided with a lower surface of polygonal shape including side parts and a pair of corner parts, an upper surface, a lateral surface situated between the lower surface and the upper surface, a pair of corner cutting edges located at the pair of corners, and a main cutting edge located in a side portion. The main cutting edge is upwardly convex in shape, and in side view includes an upwardly convex curving portion, and a pair of linear portions respectively extending toward the pair of corner cutting edges from the curving portion. The top portion of the curving portion is positioned more toward the one of the corner cutting edges which, of the pair of corner cutting edges, is that contiguous to a working surface of a work material during cutting of the work material.

9 Claims, 15 Drawing Sheets

(52) U.S. Cl.
CPC .. *B23C 2200/201* (2013.01); *B23C 2200/203* (2013.01); *B23C 2200/366* (2013.01)

(58) Field of Classification Search
CPC ............ B23C 5/207; B23C 2210/0435; B23C 2210/045; B23C 2210/207; B23C 2210/205; B23C 2210/203; B23C 5/202
See application file for complete search history.

(56) References Cited

U.S. PATENT DOCUMENTS

| | | |
|---|---|---|
| 5,382,118 A | 1/1995 | Satran et al. |
| 5,853,267 A | 12/1998 | Satran et al. |
| 6,599,061 B1 | 7/2003 | Nelson |
| 6,712,563 B2 | 3/2004 | Maier |
| 6,733,212 B2 | 5/2004 | Nagaya et al. |
| 6,921,233 B2 | 7/2005 | Duerr et al. |
| 7,021,871 B2 | 4/2006 | Arvidsson et al. |
| 7,101,121 B2 | 9/2006 | Wermeister et al. |
| 7,549,824 B2 | 6/2009 | Agic |
| 8,475,089 B2 | 7/2013 | Kakai |
| 2003/0165363 A1 | 9/2003 | Wermeister |
| 2003/0170080 A1 | 9/2003 | Hecht |
| 2004/0022590 A1 | 2/2004 | Satran et al. |
| 2010/0034602 A1 | 2/2010 | Sung et al. |
| 2010/0080662 A1 | 4/2010 | Satran et al. |
| 2010/0129167 A1 | 5/2010 | Morrison |
| 2010/0202839 A1 | 8/2010 | Fang et al. |
| 2010/0239379 A1 | 9/2010 | Choi et al. |
| 2012/0057943 A1 | 3/2012 | Zastrozynski et al. |
| 2012/0189396 A1 | 7/2012 | Xu |

FOREIGN PATENT DOCUMENTS

| | | |
|---|---|---|
| JP | 2006-075913 A | 3/2006 |
| JP | 2006-88332 A | 4/2006 |
| JP | 2010-523352 A | 7/2010 |
| WO | 2009/028748 A1 | 3/2009 |

OTHER PUBLICATIONS

Extended European Search Report dated Dec. 22, 2016 issued by the European Patent Office in counterpart European Patent Application No. 14 818 373.4.

International Search Report dated Sep. 30, 2014 and issued for International Application No. PCT/JP2014/066603.

CUTTING INSERT, CUTTING TOOL, AND METHOD FOR MANUFACTURING A CUT WORKPIECE

The present invention is a continuation of U.S. application Ser. No. 14/900,058 filed on Dec. 18, 2015 which is a National Phase entry of International Application No. PCT/JP2014/066603, filed on Jun. 24, 2014, which claims the benefit of Japanese Application No. 2013-134716, filed on Jun. 27, 2013 and Japanese Application No. 2013-231827, filed on Nov. 8, 2013. The contents of the above applications are incorporated by reference herein in their entirety.

TECHNICAL FIELD

The present invention relates to a cutting insert, a cutting tool, and a method for manufacturing a cut workpiece.

BACKGROUND ART

In the related art, the cutting inserts disclosed in Patent Documents 1 to 4 and the like are known as cutting inserts used in cut processing on a work material. Specifically, the cutting inserts disclosed in Patent Documents 1 to 4 are used in milling processing such as face milling or end milling. The cutting insert disclosed in Patent Document 4 has a cutting edge curved to be upwardly convex when viewed from the side.

Regarding the cutting inserts, as illustrated in FIG. 1, the largest impact is applied to a cutting insert 10 in a case where the angle formed by a ridge e1 of a cutting edge with respect to an end surface S of a work material 200 is small when the cutting insert 10 starts to cut into the work material 200 when viewed from above, that is, in a case where the entire ridge e1 of the cutting edge strikes the end surface S of the work material 200. When the impact applied to the cutting insert is increased, a large impact is transmitted between the cutting insert and the work material and chatter vibration is generated. Then, when the chatter vibration becomes very large, there is a risk of damaging the cutting insert or cutting tool.

In the cutting insert disclosed in Patent Document 4, the cutting edge has a convex curved shape which curves upward when viewed from the side. In such a case, the chatter vibration can be reduced because the impact applied to the cutting insert can be controlled to be smaller when the cutting insert starts to cut into the work material. However, because the total length of the cutting edge in the cutting insert disclosed in Patent Document 4 is long in comparison with a cutting insert where the cutting edge has a linear shape when viewed from the side, the contact length of the cutting edge becomes long with respect to the work material. As a result, the time during which cutting force continues to be applied to the cutting insert is also increased.

The present invention has been made in view of the above problems. An object of the present invention is to provide a cutting insert, a cutting tool, and a method for manufacturing a cutting tool and a cut workpiece, which can suppress chatter vibration and control increases in the cutting resistance when the cutting insert starts to cut into a work material.

Patent Literature 1: Japanese Unexamined Patent Application Publication No. 2006-75913A Patent Literature 2: Japanese Unexamined Patent Application Publication No. 2006-88332A Patent Literature 3: Japanese Unexamined Patent Application Publication (Translation of PCT Application) No. 2010-523352A Patent Literature 4: Japanese Unexamined Patent Application Publication No. H09-225724A

SUMMARY OF INVENTION

A cutting insert based on one aspect of the present invention is provided with an upper surface with a polygonal shape including side portions and a pair of corner parts adjacent to the side parts; a lower surface with a polygonal shape corresponding to the upper surface; a lateral surface connecting between the lower surface and the upper surface; a pair of corner cutting edges located at the pair of corners at a line of intersection of the upper surface and the lateral surface; and a main cutting edge located in the side portion at a line of intersection of the upper surface and the lateral surface, the cutting insert being used for cutting a work material. The main cutting edge is upwardly convex in shape and in side view includes an upwardly convex curving portion and a pair of linear portions respectively extending toward the pair of corner cutting edges from the curving portion. An top portion of the curving portion is positioned more toward the one of the corner cutting edges which, of the pair of corner cutting edges, is contiguous to the machined surface of the work material when cutting the work material.

DESCRIPTION OF EMBODIMENTS

<Cutting Insert>

Figure 4:
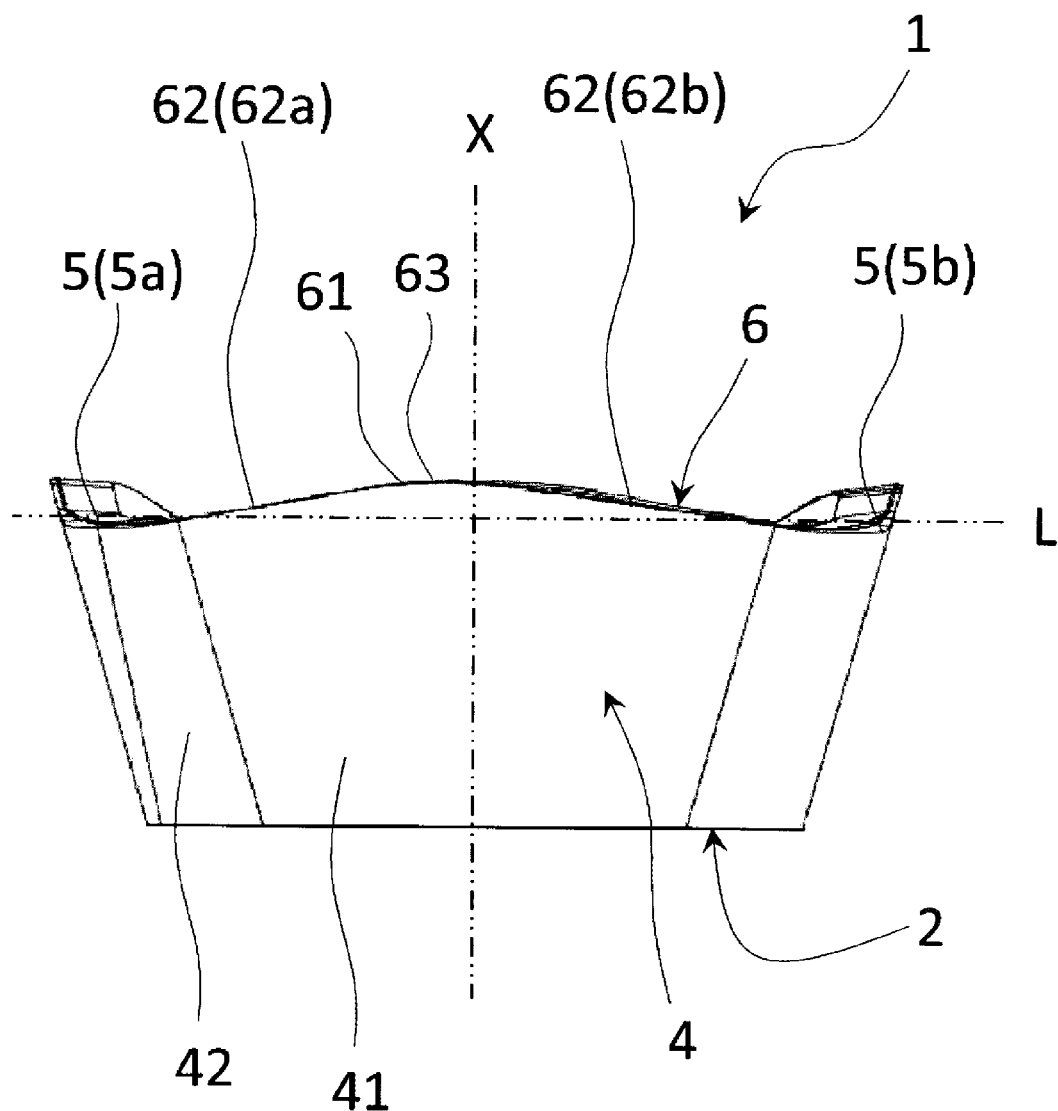
FIG. 4 is a lateral surface diagram of the cutting insert illustrating in FIG. 2.
Figure 5:
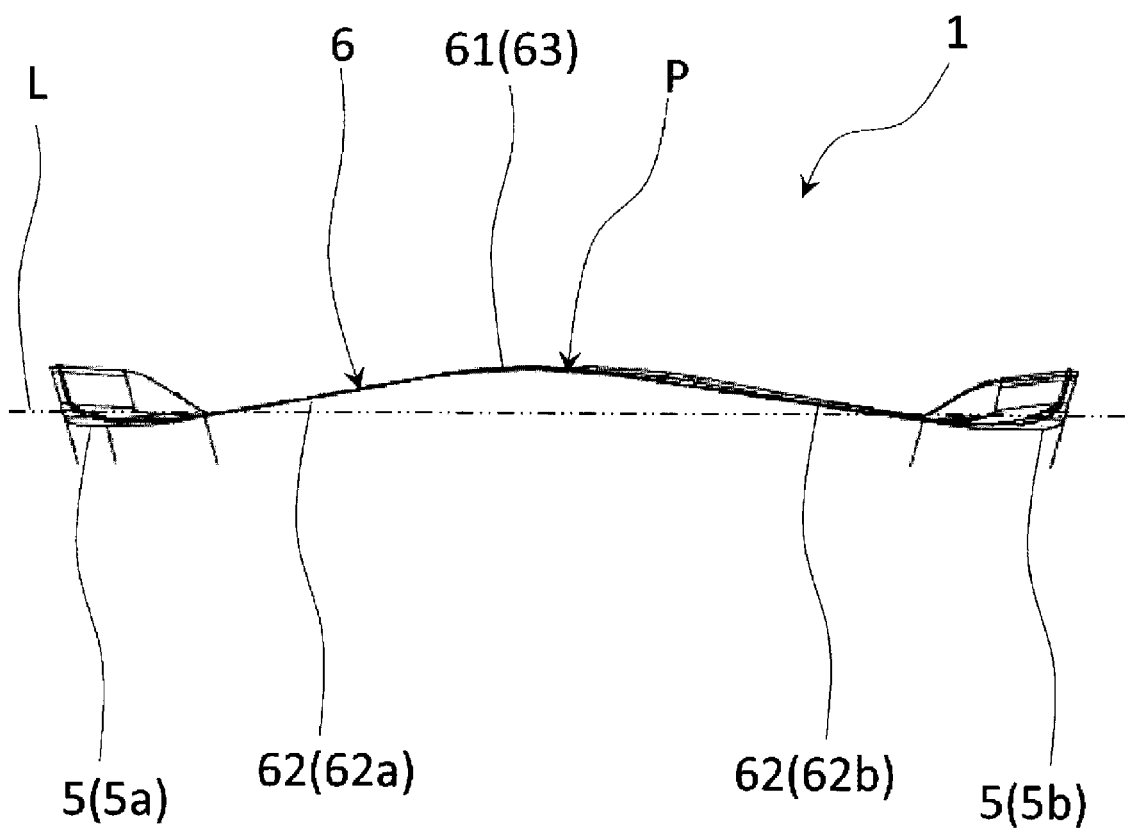
FIG. 5 is a lateral surface diagram in which the cutting insert illustrated in FIG. 4 is enlarged.

Description will be given below of a cutting insert 1 of one embodiment (referred to below simply as the insert 1) using FIGS. 2 to 5. Here, the two-dot chain line in FIG. 2 indicates the center axis X of the insert 1. FIG. 5 is a lateral surface diagram in which a part of the lateral surface of the insert 1 in FIG. 4 is cut away and enlarged.

As illustrated in FIGS. 2 to 5, the insert 1 of the present embodiment is a throw-away tip, and is provided with a lower surface 2, an upper surface 3, a lateral surface 4 connecting with the lower surface 2 and the upper surface 3, a pair of corner cutting edges 5 (5a and 5b) located at a line of intersection between the upper surface 3 and the lateral surface 4, and a main cutting edge 6 located between the pair of corner cutting edges 5 (5a and 5b). The main cutting edge 6 includes an upwardly convex shape and has an upwardly convex curving portion 61, and a pair of linear portions 62 respectively extending toward the pair of corner cutting edges 5 (5a and 5b) from the curving portion 61 in side view.

In addition, an top portion 63 located uppermost in the curving portion 61 of the main cutting edge 6 is positioned more toward the one corner cutting edge 5a which, of the pair of corner cutting edges 5a and 5b, is contiguous to the machined surface of the work material when cutting the work material. Out of the pair of corner cutting edges 5a and 5b, the cutting edge contiguous to the machined surface of the work material when cutting the work material is the first corner cutting edge 5a and the cutting edge located to be separated from the machined surface of the work material when cutting the work material is the second corner cutting edge 5b. At this time, the top portion 63 is positioned more toward the first corner cutting edge 5a than the second corner cutting edge 5b out of the pair of corner cutting edges 5a and 5b.

The upper surface 3 includes a polygonal shape and has side parts and a pair of corner parts adjacent to the side parts. In addition, the lower surface 2 has a polygonal shape corresponding to the upper surface 3. The lower surface 2 and the upper surface 3 of the insert 1 in the present embodiment respectively have rectangular shapes including a plurality of corner parts. The corner parts in the present embodiment are not corners in the strict sense, but shapes curved when viewed from above.

A through-hole H is formed to pass vertically through the insert 1. The through-hole H is formed from the central portion of the upper surface 3 to the central portion of the lower surface 2. The through-hole H is a hole through which a screw is passed and is used in order to fix the insert 1 to a holder by fastening the screw into the holder. Here, the through-hole has a circular shape when viewed from above and the diameter thereof is, for example, from 2 to 12 mm.

Because the through-hole H is formed from the center of the upper surface 3 to the center of the lower surface 2, the center axis X of the through-hole H extends in the up and down direction. Therefore, in the following, a virtual plane L perpendicular to the center axis X is set in order to evaluate the position in the up and down direction of each of the constituent components in the cutting insert 1 of the present embodiment.

Examples of the material of the insert 1 include cemented carbide alloy, cermet, or the like. As the composition of the cemented carbide alloy, for example, there are WC—Co produced by adding cobalt (Co) powder to tungsten carbide (WC) and carrying out sintering, WC—TiC—Co in which titanium carbide (TiC) is added to WC—Co, or WC—TiC—TaC—Co in which tantalum carbide (TaC) is added to WC—TiC—Co. In addition, cermet is a sintered composite material in which metal is composite with a ceramic component and specific examples thereof include titanium compounds in which titanium carbide (TiC) or titanium nitride (TiN) is the main component.

The surface of the insert 1 may be coated with a coating film using a chemical vapor deposition (CVD) method or a physical vapor deposition (PVD) method. Examples of the composition of the coating film include titanium carbide (TiC), titanium nitride (TiN), titanium carbonitride (TiCN), alumina ($Al_2O_3$), and the like.

In the insert 1, the maximum width of the lower surface 2 or the upper surface 3 is from 5 to 20 mm. In addition, the height from the lower surface 2 to the upper surface 3 is from 2 to 8 mm. Here, the shapes of the upper surface 3 and the lower surface 2 are not limited to those of the embodiment described above. For example, the shape of the upper surface 3 when viewed from above may be a polygonal shape such as a triangle, a pentagon, a hexagon, or an octagon.

Figure 2:
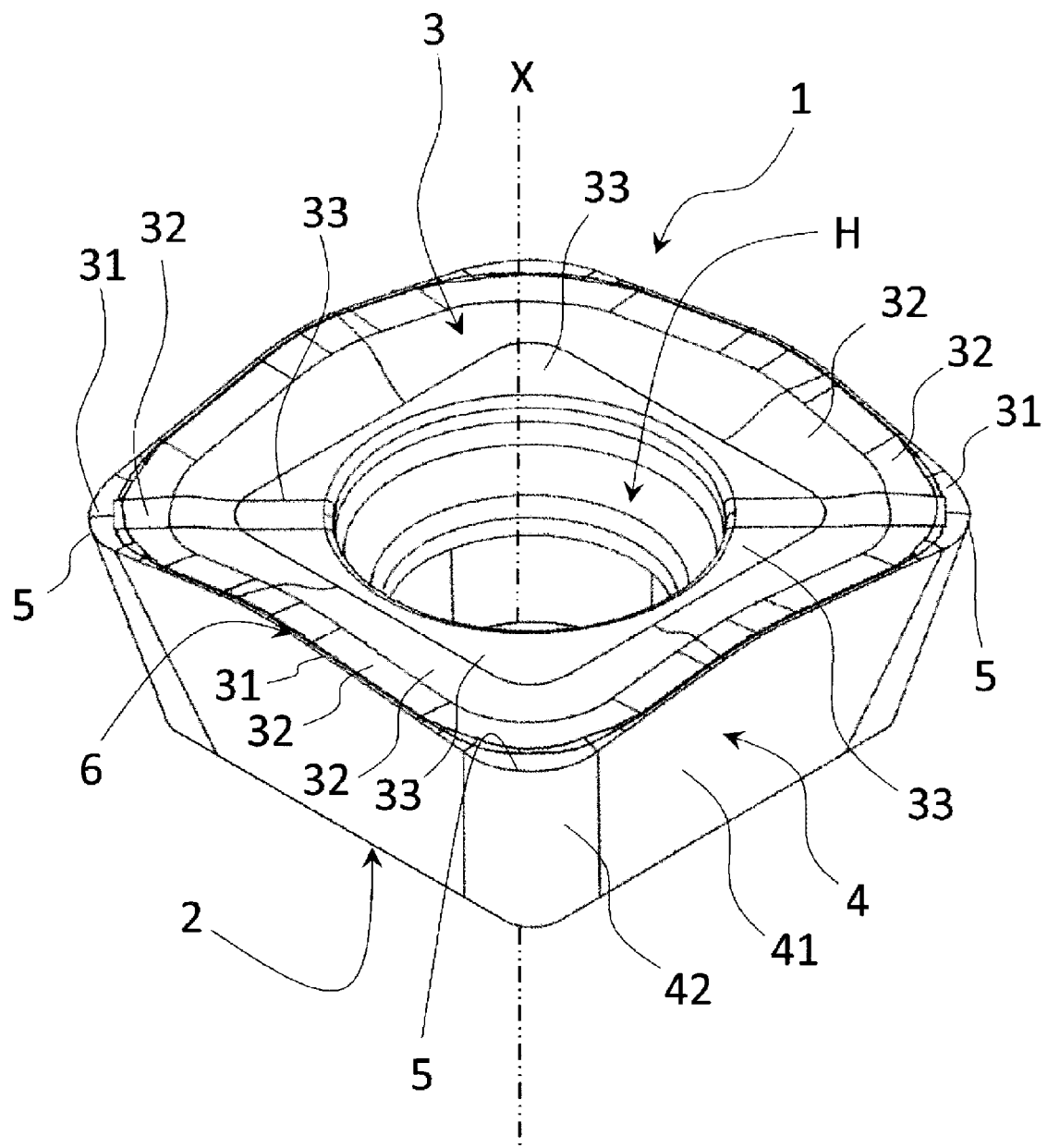
FIG. 2 is a perspective diagram illustrating the cutting insert of one embodiment of the present invention.
Figure 3:
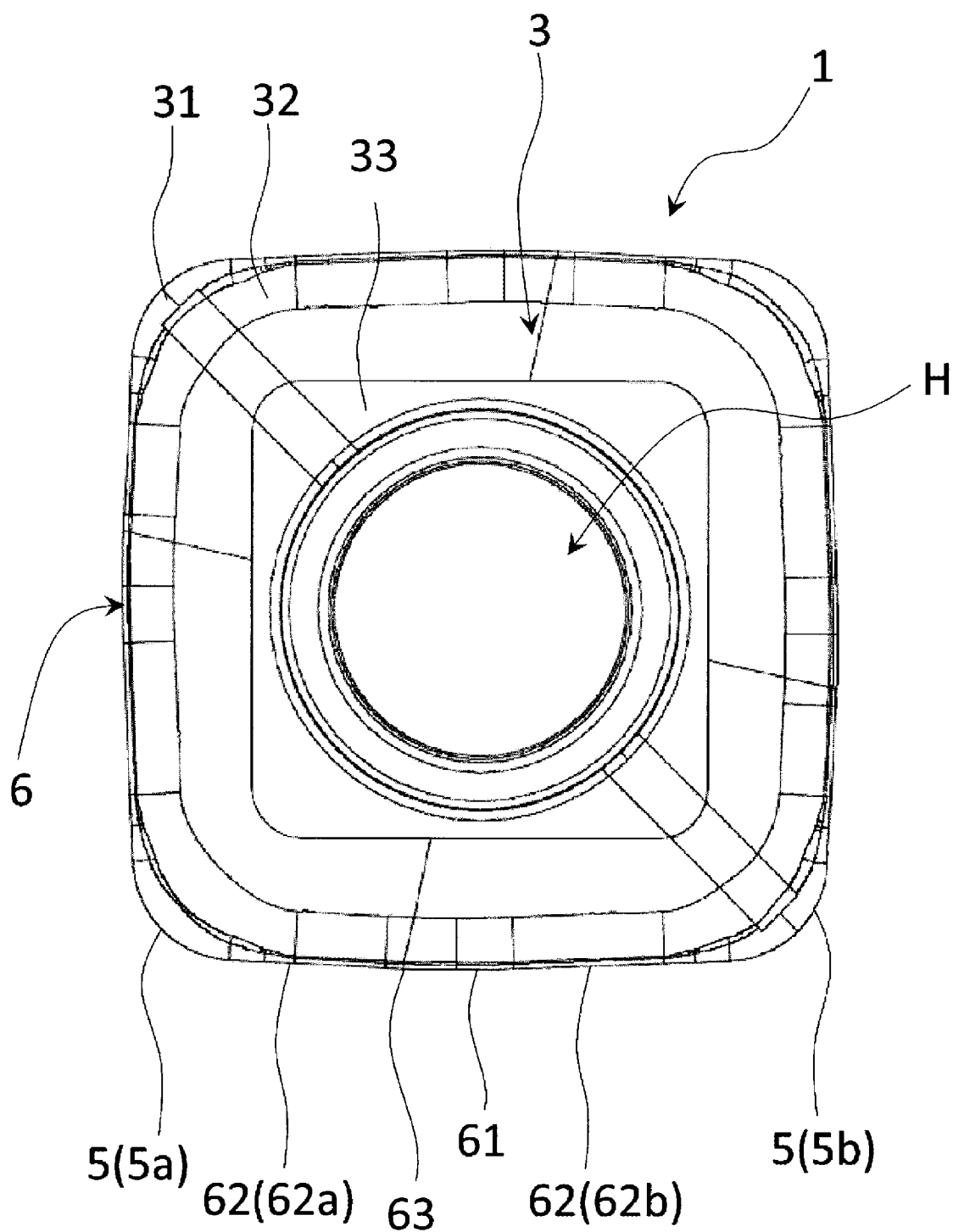
FIG. 3 is a planar diagram of the cutting insert illustrating in FIG. 2.

As illustrated in FIG. 2, the upper surface 3 includes a land surface 31, a rake face 32, and a flat surface 33. The land surface 31 is continuous with the corner cutting edges 5 and the main cutting edge 6. The corner cutting edges 5 and the main cutting edge 6 correspond to the outer edge of the upper surface 3. The rake face 32 is provided in a region closer to the through-hole H than the land surface 31. In addition, the rake face 32 is an inclined surface of which the height is lowered toward the through-hole H. The flat surface 33 is provided in a region closer to the through-hole H than the rake face 32. In addition, the flat surface 33 is a flat surface perpendicular to the center axis X in the penetrating direction of the through-hole H. Here, the lower surface 2 in the present embodiment is formed on a plane perpendicular to the center axis X.

The land surface 31 is continuous with the corner cutting edges 5 and the main cutting edge 6 and is provided in a region closer to the center axis X than the corner cutting edges 5 and the main cutting edge 6. The land surface 31 refers to a surface of a strip with a narrow width provided along the corner cutting edges 5 and the main cutting edge 6 and is either substantially parallel to the lower surface 2 or an inclined surface of which the height is lowered toward the center. Here, in the land surface 31, a part of a region close to the corner cutting edges 5 also includes a place where the height is increased toward the center.

The corner cutting edges 5 and the main cutting edge 6 are formed at a line of intersection between the land surface 31 and the lateral surface 4. The land surface 31 is provided in order to increase the strength of the corner cutting edges 5 and the main cutting edge 6. The rake face 32 located on the inner side of the land surface 31 is, as described above, an inclined surface of which the height is lowered toward the center. Therefore, the interior angle formed by the rake face 32 and the lateral surface 4 is small. However, because the interior angle formed by the land surface 31 and the lateral surface 4 is larger than the interior angle formed by the rake face 32 and the lateral surface 4, the strength of the corner cutting edges 5 and the main cutting edge 6 can be increased by including the land surface 31. Here, the width of the land surface 31 located between the outer edge of the upper surface 3 and the outer edge of the rake face 32 is appropriately set according to the cutting conditions, but is set to a range of, for example, 0.05 to 0.5 mm.

The rake face 32 is continuous with the land surface 31 and is provided in a region closer to the center axis X than the land surface 31. The rake face 32 refers to a surface on the main cutting edge 6 on which cut chips are scraped away. For this reason, the chips of the work material flow so as to be transported over the surface of the rake face 32. The rake face 32 is an inclined surface of which the height is lowered toward the center of the upper surface 3 in order to facilitate the chip processing.

Although not particularly illustrated, the inclination angle of the angle formed by the lower surface 2 in a cross-section orthogonal to the rake face 32 and the rake face 32 may be set to a range of, for example, 5 to 30°. Because the rake face 32 may have a height which is lower toward the center, the rake face 32 may be configured by a plurality of regions of which the inclination angles are different to each other, and may be configured to have a recessed curved shape.

The flat surface 33 is continuous with the rake face 32 and is provided in a region closer to the center axis X than the rake face 32. A through-hole H is provided further toward the center axis X than the flat surface 33. By providing the flat surface 33, the insert 1 can be fixed to the holder using a retainer (not illustrated) called a clamper. Specifically, it is possible to clamp the insert 1 using the clamper and the holder by pressing the lower surface 2 and the flat surface 33, and the insert 1 can be fixed between the clamper and the holder.

The lateral surface 4 is provided between the lower surface 2 and the upper surface 3. The lateral surface 4 functions as a flank surface and is connected with the outer edge of the upper surface 3. The lateral surface 4 includes a flat part 41 with a flat shape located at a place corresponding to the main cutting edge 6 and a curved portion 42 with a curved shape located at a place corresponding to the corner cutting edges 5. In this manner, the lateral surface 4 includes the flat part 41 continuous with the main cutting edge 6. In the flat part 41, the length in a direction parallel to the lower surface 2 when viewed from the side is set to a range of, for example, 5 to 20 mm. In the flat part 41, the length in the up and down direction when viewed from the side is set to a range of 2 to 8 mm. In addition, the curved portion 42 is located at a place connected with the flat parts 41 located on different lateral surfaces.

By providing the flat parts 41 on the lateral surfaces 4, it may be simply confirmed to what extent the surface of the flat parts 41 are worn in order to measure the state of the wear of the flank surface. Therefore, it is easy to measure the wear by using actual measurements from a photograph or the like. Here, in the present embodiment, the entirety of the lateral surface 4 from the upper end to the lower end of the place corresponding to the main cutting edge 6 is set as the flat part 41; however, the present invention is not limited thereto. For example, a place at a part continuous with the main cutting edge 6 may be set as the flat part 41 and a step or the like may be provided below this flat part 41. The main cutting edge 6, which is a line of intersection between the upper surface 3 and the lateral surface 4, is formed on the side part. The main cutting edge 6 has an upwardly convex shape as a whole when viewed from the side as illustrated in FIG. 4 or FIG. 5.

The insert 1 according to the present embodiment includes a rectangular shape when viewed from above and includes four side part and four corner parts.

Two corner parts are paired to be adjacent at each side part. Therefore, the insert 1 according to the present embodiment includes four main cutting edges 6. Then, the corner cutting edges 5 are provided between the main cutting edges 6 along the outer edge of the upper surface 3. Therefore, four of the corner cutting edges 5 are formed.

Here, because the insert 1 of the present embodiment has a rectangular shape when viewed from above, four of the main cutting edges 6 and four of the corner cutting edges 5 are formed; however, the present invention is not limited thereto. The number of the main cutting edges 6 and the corner cutting edges 5 may, for example, be 3, 5, 6, or more depending on the polygonal shape of the insert 1 when viewed from above.

Figure 10:
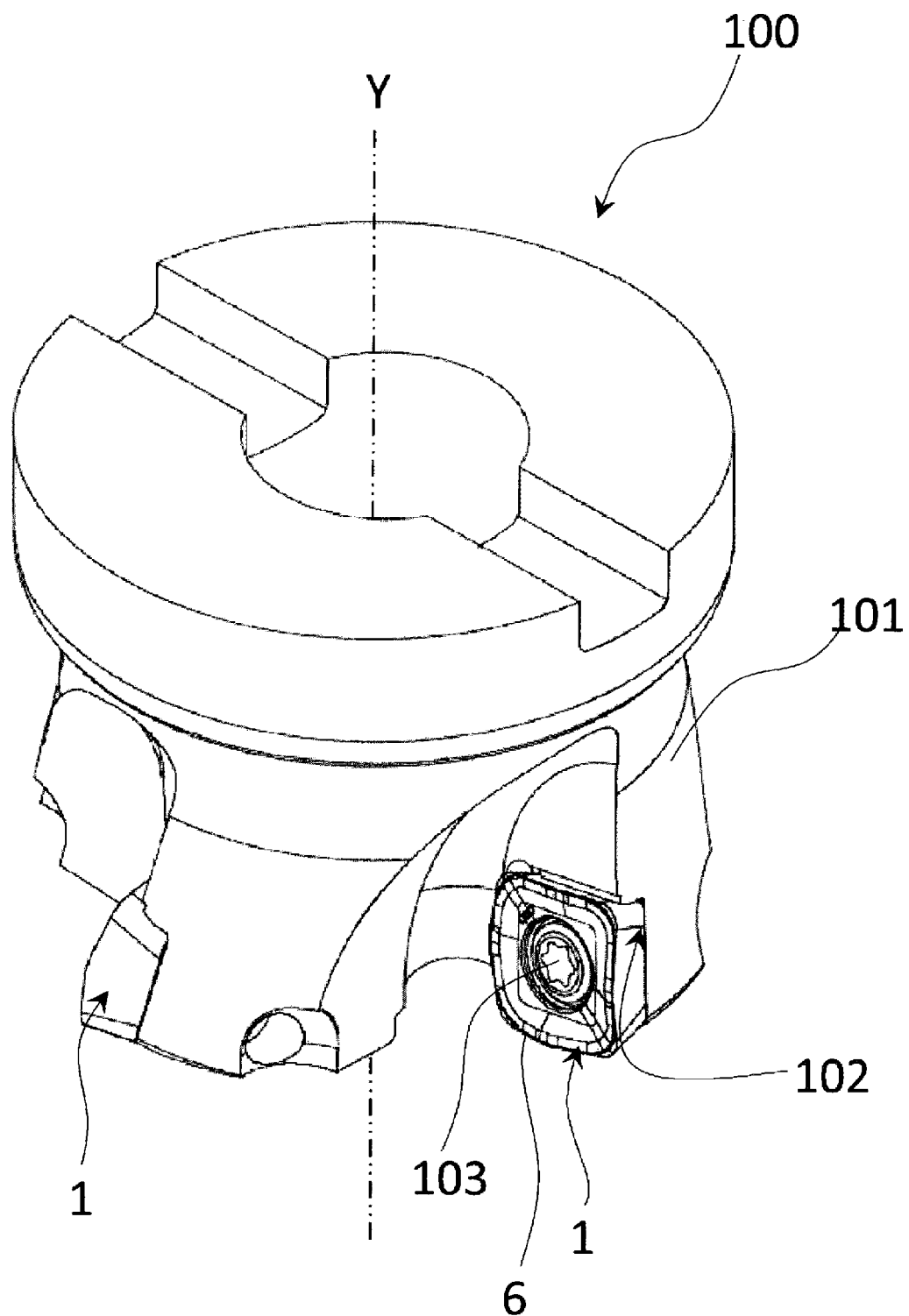
FIG. 10 is a perspective diagram illustrating a cutting tool of one embodiment of the present invention.

In a cutting tool 100 illustrated in FIG. 10 using the insert 1 of the present embodiment, one of the four main cutting edges 6 is used in the cut processing on the work material. Here, in a case where the main cutting edge 6 being used deteriorates due to prolonged cut processing, after temporarily removing the insert 1 from a holder 101, the holder 101 may be attached once more after rotating the insert 1 90° with respect to the center axis X. Because of this, another of the unused main cutting edges 6 can be used in the cut processing on the work material.

Although not illustrated, the line of intersection between the upper surface 3 and the lateral surface 4 does not have a strict linear shape due to the intersection of the two surfaces. When the line of intersection between the upper surface 3 and the lateral surface 4 is sharpened to an acute angle, the durability of the main cutting edge 6 is decreased. Therefore, the portion where the upper surface 3 and the lateral surface 4 intersect may have a slightly curved surface shape, that is, may be subjected to a honing process.

As illustrated in FIG. 4 or FIG. 5, the main cutting edge 6 has an upwardly convex shape rather than a linear shape as a whole when viewed from the side. Specifically, the main cutting edge 6 includes the curving portion 61 with an upwardly convex curved shape and a pair of linear portions 62 provided to be continuous with the curving portion 61. The pair of linear portions 62 respectively extend from the curving portions 61 toward the pair of corner cutting edges 5. When the main cutting edge 6 has such a shape, in comparison with a case where the main cutting edge 6 has a linear shape parallel to the upper surface 3, the main cutting edge 6 is inclined with respect to the work material so as to easily come into contact therewith. Therefore, the work material can be favorably processed because it is possible to decrease the cutting resistance.

Here, out of the pair of linear portions 62 (62a and 62b), the linear portion extending toward the first corner cutting edge 5a is the first linear portion 62a and the linear portion extending toward the second corner cutting edge 5b is the second linear portion 62b.

Here, that the linear portion 62 extends toward the corner cutting edges 5 simply has the meaning of extending toward the side at which the pair of corner cutting edges 5a and 5b are located rather than being limited to the meaning that a virtual extension line of the linear portion 62 intersects with the corner cutting edges 5. For example, in FIG. 5, because the first corner cutting edge 5a is located on the left end, the linear portion extending from the curving portion 61 toward the left side is set as the first linear portion 62a. In addition, in FIG. 5, because the second corner cutting edge 5b is located on the right end, the linear portion extending from the curving portion 61 toward the right side is set as the second linear portion 62b.

As long as the curving portion 61 has an upwardly convex curved shape, the shape is not particularly limited and, for example, can be set to an arc shape, an elliptical shape, or a parabolic shape. In the present embodiment, the curving portion 61 has an upwardly convex arc shape. In such a case, there is less susceptibility to the influence of axial rake when attaching the insert 1 to the holder and the insert 1 can stably cut into the work material.

Figure 1:
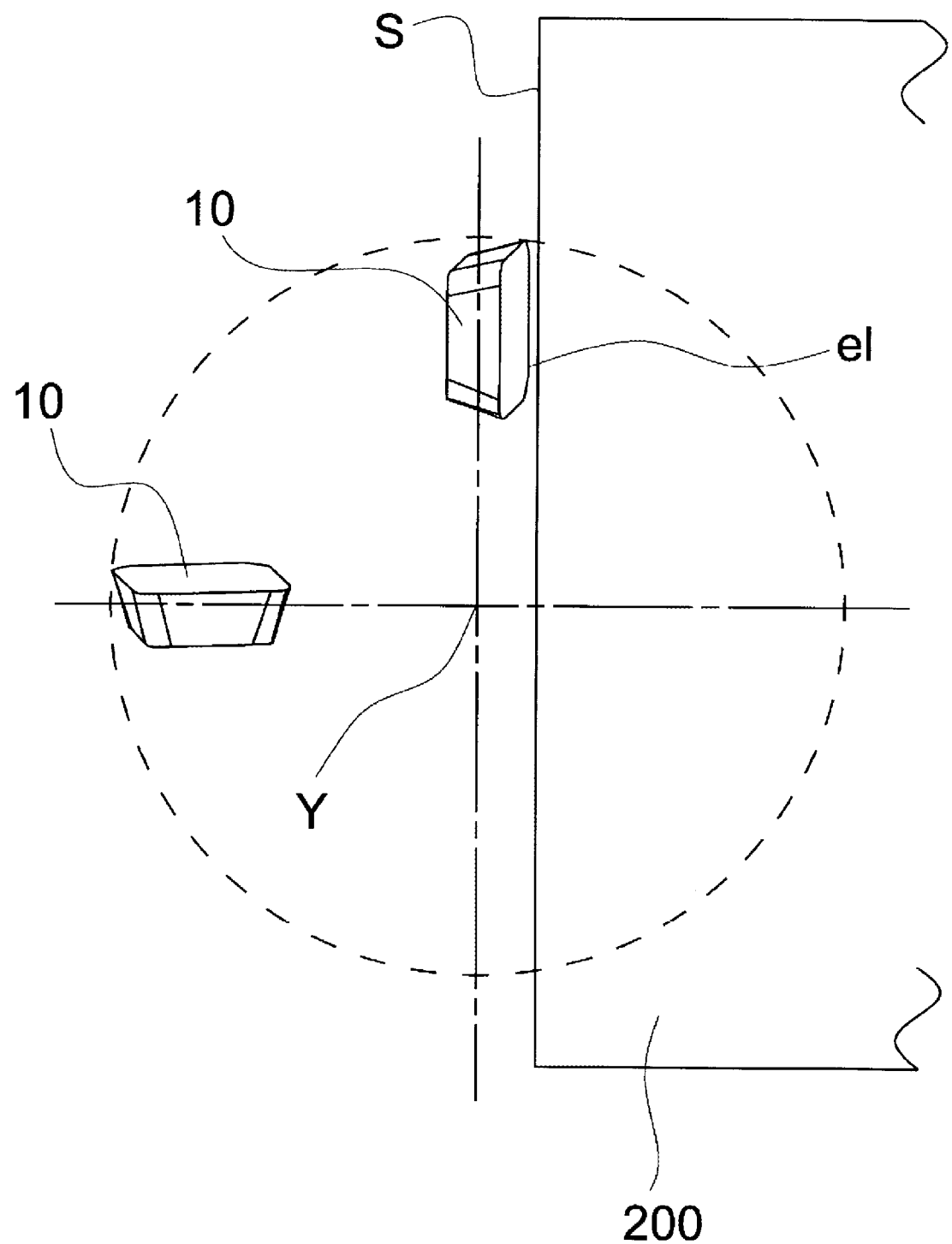
FIG. 1 is a planar schematic diagram illustrating a state when a cutting edge ridge of a cutting insert starts to cut into an end surface of a work material. Here, the point where the one-dot chain lines intersect in FIG. 1 is a rotation center axis Y of the cutting tool and the dotted line shows the outer edge of the rotation locus of the cutting inserts.

Here, description will be given assuming a case where all of the main cutting edges 6 have a linear shape. When the main cutting edges 6 of the insert 1 start to cut into the end surface of the work material, strong chatter vibration is generated in the insert 1. In a case where all of the main cutting edges 6 simply have a linear shape, as illustrated in FIG. 1, depending on the angle at which the main cutting edge 6 starts to strike the work material, the entirety of the main cutting edge 6 may start to strike the work material at the same time, and a large impact is applied to the insert 1 and vibration is generated, which is a factor which generates chatter vibration. Because it is not possible to improve the cutting conditions when chatter vibration is generated, the processing efficiency cannot be improved.

In addition, assuming a case where all of the main cutting edges 6 have an upwardly convex curved shape, the main cutting edge 6 may start to strike the work material at one point. However, when the main cutting edge 6 starts to cut into the work material, because the total length of the main cutting edge 6 is increased in comparison with when all of the main cutting edges 6 have a linear shape, the time during which a strong impact continues to be applied to the insert 1 is also increased.

In the insert 1 according to the present embodiment, the main cutting edges 6 include the curving portion 61 with an upwardly convex curved shape and the pair of linear portion 62 provided to be continuous with the curving portions 61. Therefore, when starting the cutting, the entirety of the main cutting edge 6 does not strike the work material and, furthermore, the overall length of the main cutting edge 6 can be shortened in comparison with a case where the entirety of the main cutting edge 6 has an upwardly convex curved shape. Therefore, the insert 1 according to the present embodiment can reduce the cutting resistance, the impact is lessened, and it is possible to control increases in the cutting resistance when the insert 1 starts to cut into the work material.

In addition, as illustrated in FIG. 5, in the main cutting edge 6, the top portion 63 which is a portion located to be uppermost in the curving portion 61 is positioned more toward the first corner cutting edge 5a which, of the pair of corner cutting edges 5 (5a and 5b), is contiguous to the machined surface of the work material. Specifically, in a case where the insert 1 is viewed from the side, an interval in a direction parallel to the virtual plane L between the top portion 63 and the first corner cutting edge 5a is shorter than an interval in a direction parallel to the virtual plane L between the top portion 63 and the second corner cutting edge 5b.

The top portion 63 is formed at a higher position, for example, from 0.2 to 1.2 mm above the height position of the corner cutting edges 5. Then, the main cutting edge 6 has, for example, a length of 5 to 25 mm in the planar direction of the lower surface 2 and the top portion 63 is formed to be shifted by, for example, 0.5 to 1.5 mm to the side of the first corner cutting edge 5a with respect to the center position Pin the length of the main cutting edge 6 in the planar direction. In addition, out of the pair of the linear portions 62 (62a and 62b), the first linear portion 62a extending toward the first corner cutting edge 5a is formed to be shorter than the second linear portion 62b extending toward the second corner cutting edge 5b.

In addition, for each of the pair of linear portions 62, when viewed from the side, the inclination angle of the first linear portion 62a with respect to the virtual plane L is larger than the inclination angle of the second linear portion 62b with respect to the virtual plane L. Specifically, the inclination angle of the first linear portion 62a is set to from 5 to 15° and the inclination angle of the second linear portion 62b is set to from 3 to 13°.

Figure 11:
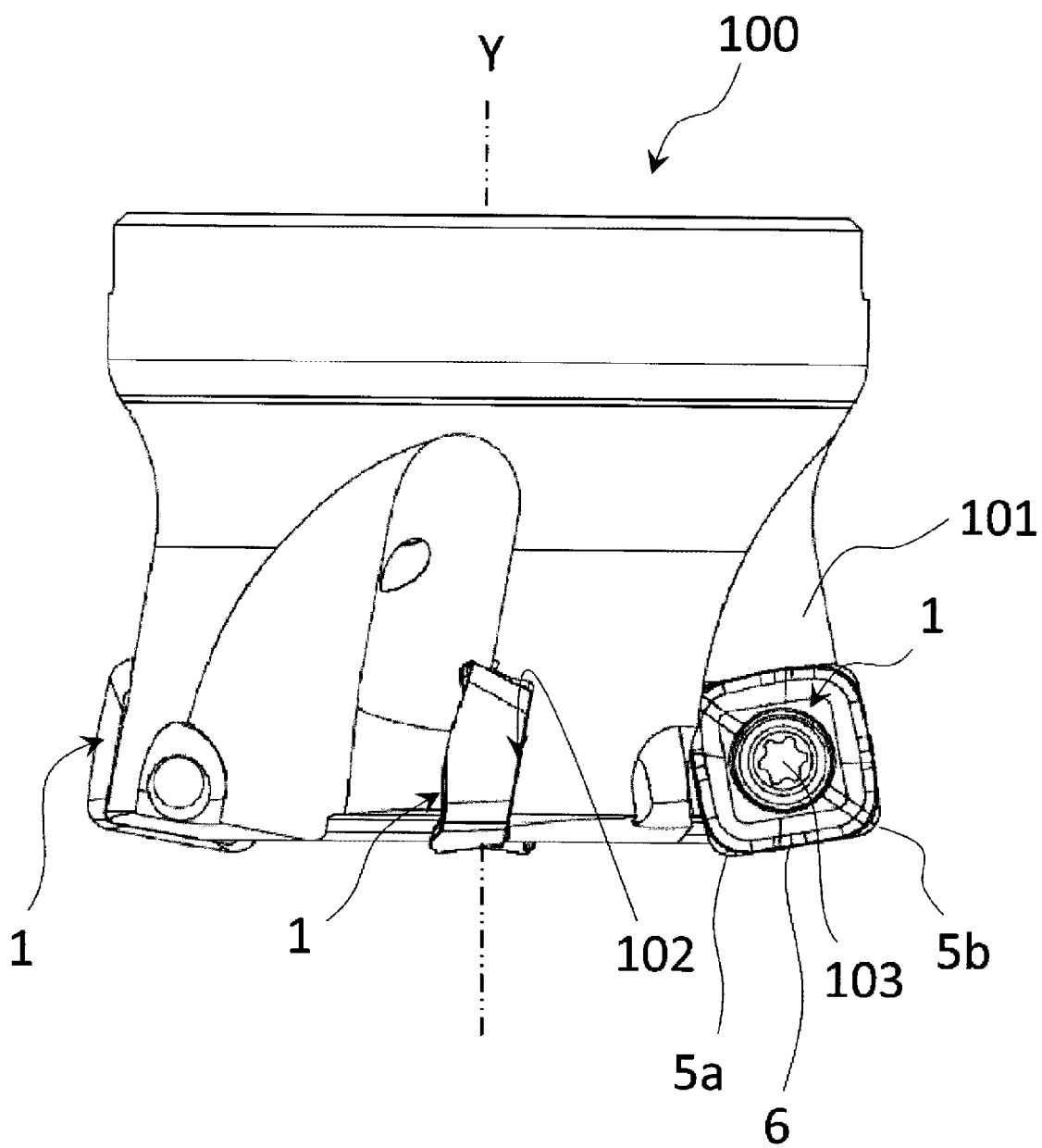
FIG. 11 is a lateral surface diagram of the cutting tool illustrated in FIG. 10.
Figure 12:
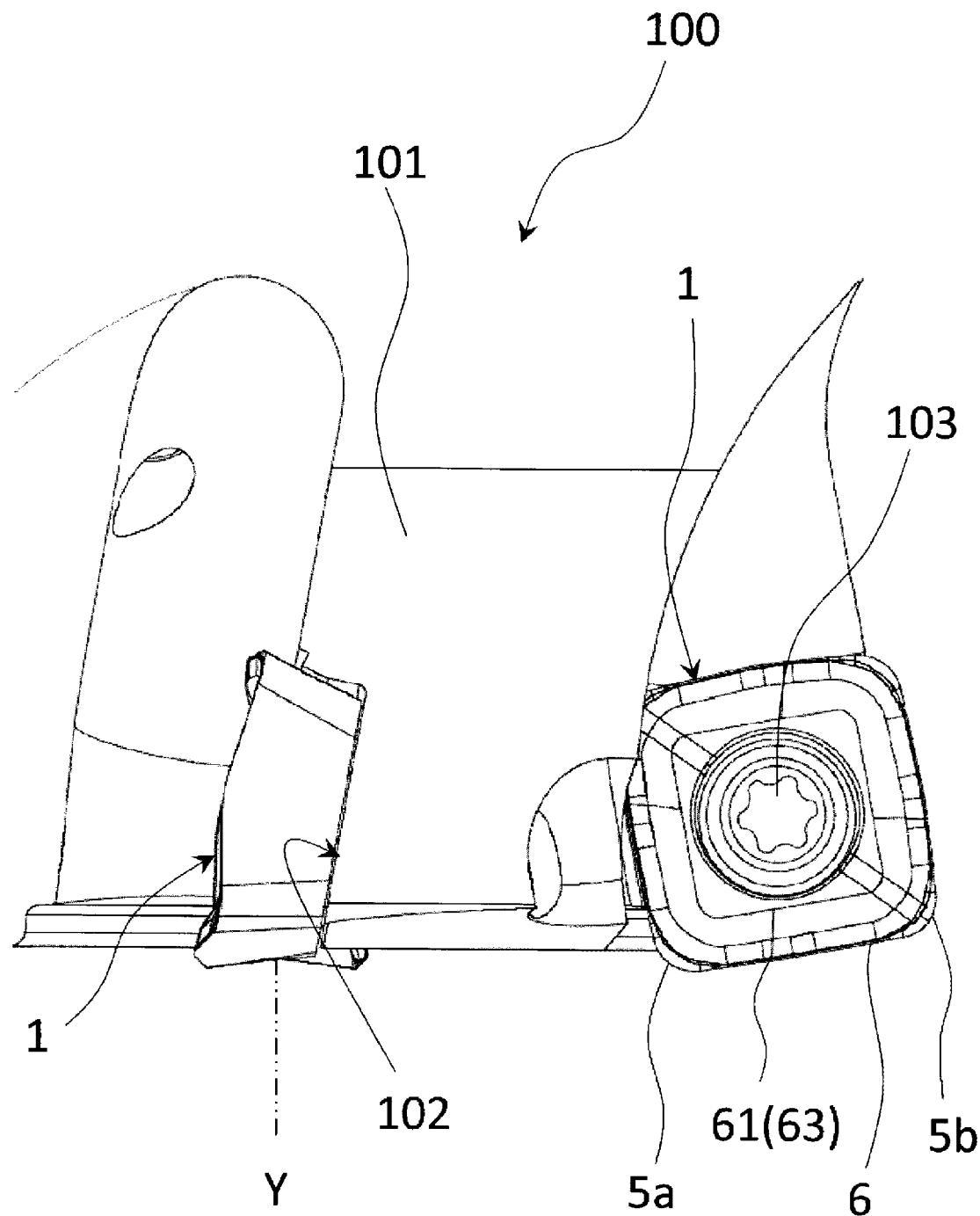
FIG. 12 is a lateral surface diagram in which a part of the cutting tool illustrated in FIG. 11 is enlarged.

As illustrated in FIGS. 10 to 12, the insert 1 according to the present embodiment is attached to the holder 101 such that a part of the first corner cutting edge 5a and the main cutting edge 6 protrudes further toward the work material than the leading end surface of the holder 101. At this time, because the top portion 63 is located on the curving portion 61 and is positioned more toward the first corner cutting edge 5a which is contiguous to the machined surface of the work material, it is possible to keep the place on the main cutting edge 6 which contacts the work material small when the main cutting edge 6 starts to strike the work material.

In addition, by providing the first linear portion from the curving portion 61 toward the first corner cutting edge 5a, the contact length can be controlled to be short when starting to cut into the work material, and it is possible to suppress chatter vibration. Furthermore, out of the pair of linear portions, because the first linear portion is shorter than the second linear portion, the contact length where the linear portion contacts the work material can be effectively controlled, and it is possible to control increases in the cutting resistance when the insert 1 starts to cut into the work material.

In this manner, the main cutting edge 6 includes the curving portion 61 with an upwardly convex curved shape and a pair of linear portions 62 provided to be continuous with the curving portion 61. Therefore, the advantages of both a case where the entirety of the main cutting edge 6 has a linear shape and a case where the entirety of the main cutting edge 6 has an upwardly convex curved shape are provided. Furthermore, because the top portion 63 of the curving portion 61 is positioned more toward the first corner cutting edge 5a which is contiguous to the machined surface of the work material, the influence because of the cutting depth of the work material is reduced such that the top portion 63 can stably cut into the work material. In this manner, in the insert 1 of the present embodiment, the impact is lessened when the insert 1 starts to cut into the work material and it is possible to control increases in the cutting resistance during the cut processing.

<Modification>

Here, the present invention is not limited to the embodiments described above and various changes, improvements, and the like are possible in a range not departing from the gist of the present invention.

Description will be given below of a modification of the present embodiment. Here, in a cutting insert 1x according to the modification of the present embodiment, the same reference numerals are applied to portions which are the same as the insert 1 according to the embodiment described above and description thereof will be appropriately omitted.

Figure 6:
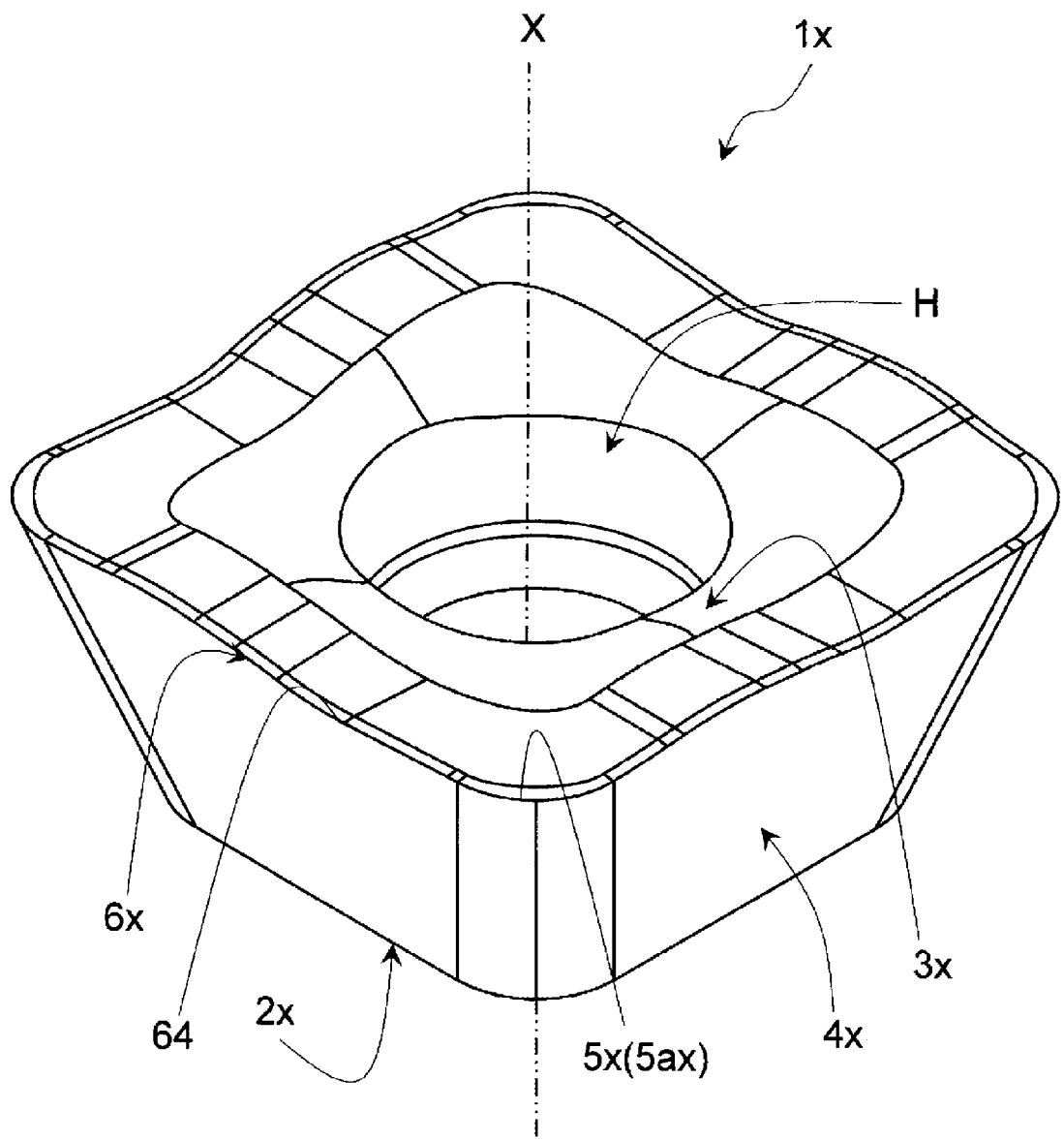
FIG. 6 is a perspective diagram illustrating a cutting insert according to a modification.
Figure 7:
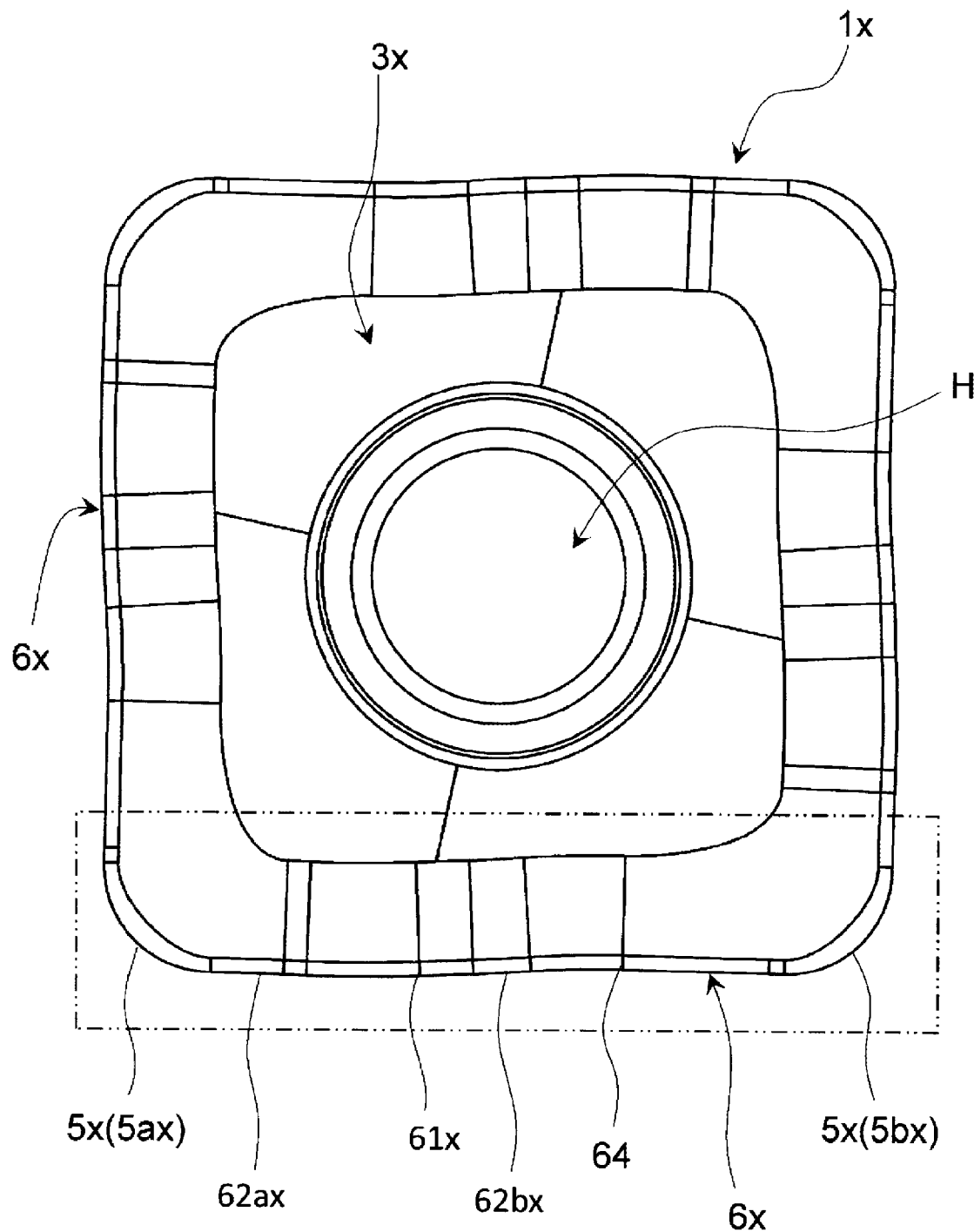
FIG. 7 is a planar diagram of the cutting insert illustrated in FIG. 6.
Figure 8:
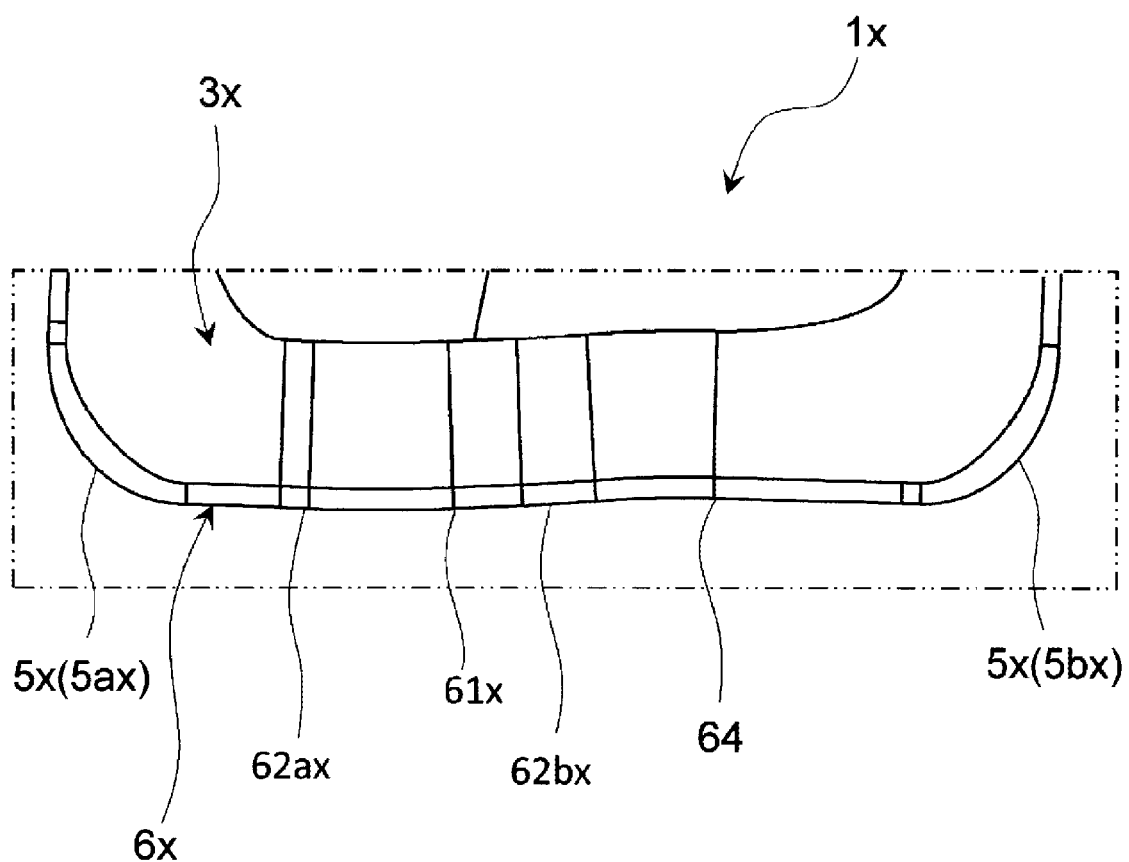
FIG. 8 is a planar diagram in which the cutting insert illustrated in FIG. 7 is enlarged.
Figure 9:
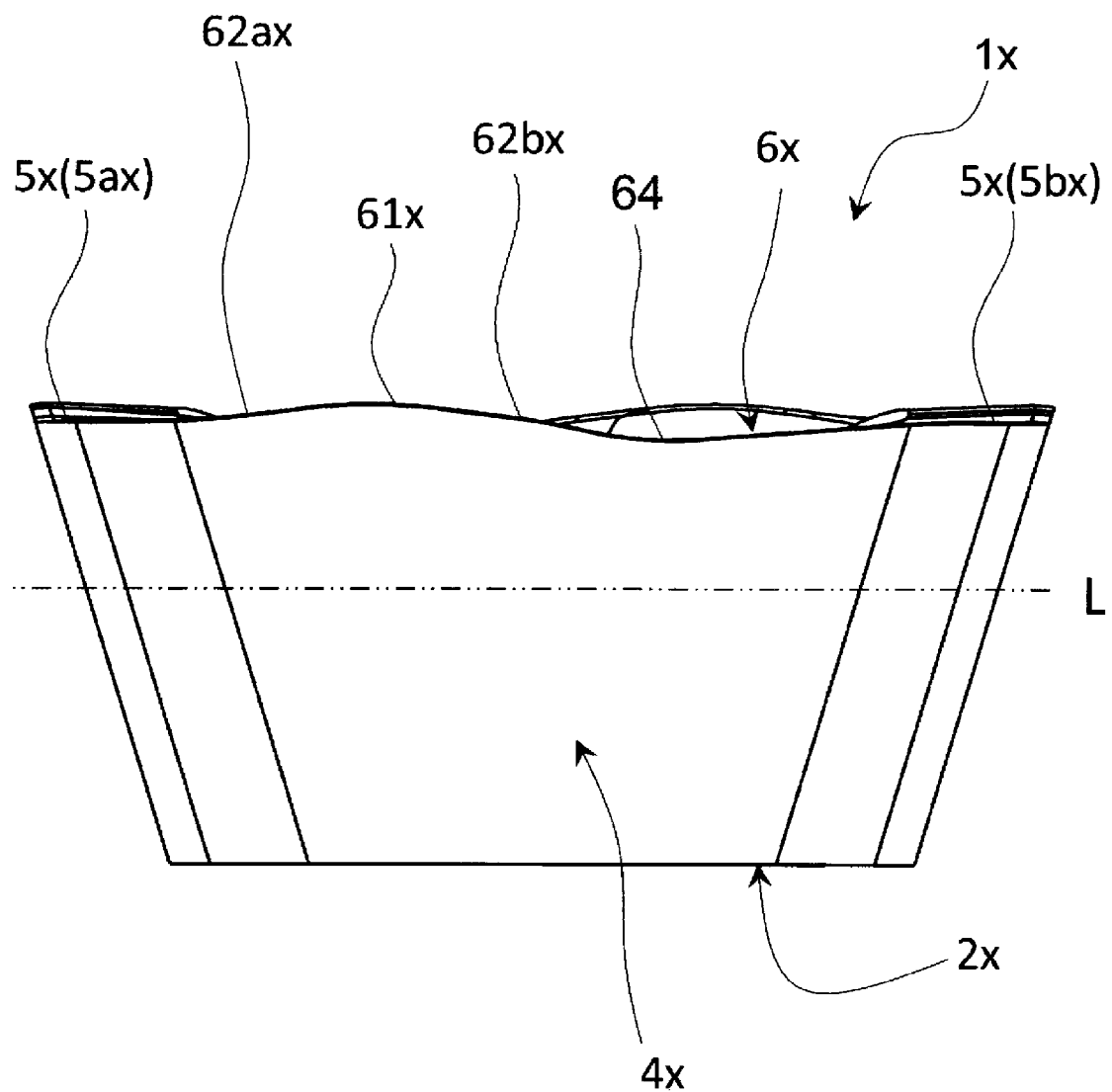
FIG. 9 is a lateral surface diagram of the cutting insert illustrated in FIG. 6.

FIG. 6 is an external appearance perspective diagram of the insert 1x according to one modification in which a first corner cutting edge 5ax is placed in front and an upper surface 3x is viewed from above. FIG. 7 is an upper surface diagram of the insert 1x according to the modification. FIG. 8 is an upper surface diagram of the insert 1x according to the modification illustrated in FIG. 7 and illustrates a shape in a case when a main cutting edge 6x is viewed from above. FIG. 9 is a lateral surface diagram of the insert 1x according to the modification and illustrates the shape when the main cutting edge 6x is viewed from the side.

In the cutting insert 1 of the embodiment described above, when viewed from the side, the main cutting edge 6 includes the upwardly convex curving portion 61 and includes a pair of linear portions 62 (62a and 62b) respectively extending from the curving portion 61 toward the pair of corner cutting edges 5 (5a and 5b). In the embodiment described above, the main cutting edge 6 is configured by these sections; however, the main cutting edge 6 may further include a bent part 64.

In the same manner as the embodiment described above, the insert 1x according to the modification includes a lower surface 2x, the upper surface 3x, and a lateral surface 4x, and a cutting edge is formed at a ridge where the upper surface 3a and the lateral surface 4x intersect. As the cutting edges, there are a corner cutting edge 5x and the main cutting edge 6x in the same manner as the embodiment described above. Then, the main cutting edge 6x further includes the bent part 64 located between the second linear portion 62bx and the second corner cutting edge 5b in addition to a curving portion 61x, a first linear portion 62ax, and a second linear portion 62bx. The bent part 64 includes a downwardly convex shape when viewed from the side and, as illustrated in FIG. 9, is formed such that the height position in the up and down direction in the main cutting edge 6x includes the section which is the lowermost point. Here, the lower end of the bent part 64 is set at a low position which is, for example, from 0.2 to 1.2 mm below the top portion 63.

In addition, as illustrated in FIG. 7 or FIG. 8, in the main cutting edge 6x, the bent part 64 is recessed toward the center of the upper surface 3x when viewed from above. Here, being recessed toward the center of the upper surface 3x means being located so as to be closer to the center of the upper surface 3x than a tangential line connecting both of the pair of corner cutting edges 5 (5ax and 5bx). In the bent part 64, an interval between the portion, which is closer to the center of the upper surface 3x than the tangential line described above, and the tangential line described above is set to a range of 0.02 to 0.2 mm.

In the insert 1x according to the present modification, the main cutting edge 6x includes the bent part 64. Therefore, when the insert 1x is attached to the holder 101 to cut the work material, the cutting angle on the outer peripheral side of the main cutting edge 6x can be reduced. Because of this, during shoulder machining, the thickness of the chips in the vicinity of the corner cutting edges 5 can be reduced, thereby lessening the impact during cutting. Accordingly, it is possible to improve the fracture resistance of the corner cutting edges 5x and the main cutting edge 6x.

<Cutting Tool>

Next, description will be given of a cutting tool 100 of an embodiment of the present invention using FIGS. 10 to 12. FIGS. 10 to 12 illustrate a state where the insert 1 is attached to an insert pocket 102 of the holder 101 using a screw 103. Here, the two-dot chain line in FIG. 10 indicates the rotation center axis Y of the cutting tool 100.

As illustrated in FIGS. 10 to 12, the cutting tool 100 of the present embodiment includes a rotation center axis Y and is provided with the holder 101 including a plurality of insert pockets 102 (simply referred to below as pockets 102) on the outer peripheral surface of the leading end side and the inserts 1 described above, which are mounted in each of the pockets 102.

The holder 101 has a substantially cylindrical shape centered on the rotation center axis Y. Then, outer peripheral surface of the leading end side of the holder 101 is provided with a plurality of the pockets 102. The pockets 102 are portions on which the inserts 1 are mounted and are opened to the outer peripheral surface and the leading end surface of the holder 101. The plurality of pockets 102 may be provided at equal intervals or unequal intervals. Because the plurality of pockets 102 are formed in the holder 101, the holder 101 does not have a strictly cylindrical shape.

Then, the inserts 1 are mounted in the plurality of pockets 102 provided in the holder 101. The plurality of inserts 1 are mounted such that parts of the cutting edges are in front of the leading end surface of the holder 101, that is, protrude further toward the work material than the leading end surface of the holder 101. Specifically, the plurality of inserts 1 are mounted on the holder 101 such that parts of the corner cutting edge 5a and the main cutting edge 6 protrude from the leading end surface of the holder 101.

At this time, the corner cutting edge 5a is fixed at a position protruding the furthest from the leading end surface of the holder 101 upon cutting. As illustrated in FIG. 12, the inserts 1 are mounted on the pockets 102 such that the corner cutting edges 5a protrude toward the front from the leading end surface of the holder 101. Because of this, the top portion 63 of the curving portion 61 is attached to the holder 101 and is positioned more toward the first corner cutting edge 5a which is contiguous to the machined surface of the work material.

In addition, in the cutting tool 100 of the present embodiment, the first corner cutting edge 5a of the insert 1 is located to be closer to the rotation center axis Y than the second corner cutting edge 5b. Therefore, the top portion 63 positioned more toward the first corner cutting edge 5a is closer to the rotation center axis Y. Because the top portion 63 which initially contacts the work material is closer to the rotation center axis Y, it is possible to control the moment of the force applied to the cutting tool 100 to be small when the insert 1 cuts into the work material. Accordingly, the vibration of the cutting tool 100 can be controlled to be small.

In the present embodiment, the insert 1 is mounted in the pocket 102 using the screw 103. That is, the screw 103 is inserted into a through-hole in the insert 1 and the leading end of the screw 103 is inserted into a screw hole (not illustrated) formed in the pocket 102 such that the insert 1 is mounted on the holder 101 by fixing the screw 103 into the screw hole. Here, for the holder 101, it is possible to use steel, cast iron, or the like. In particular, it is preferable to use steel with a high toughness in these materials.

<Method for Manufacturing a Cut Workpiece>

Figure 13:
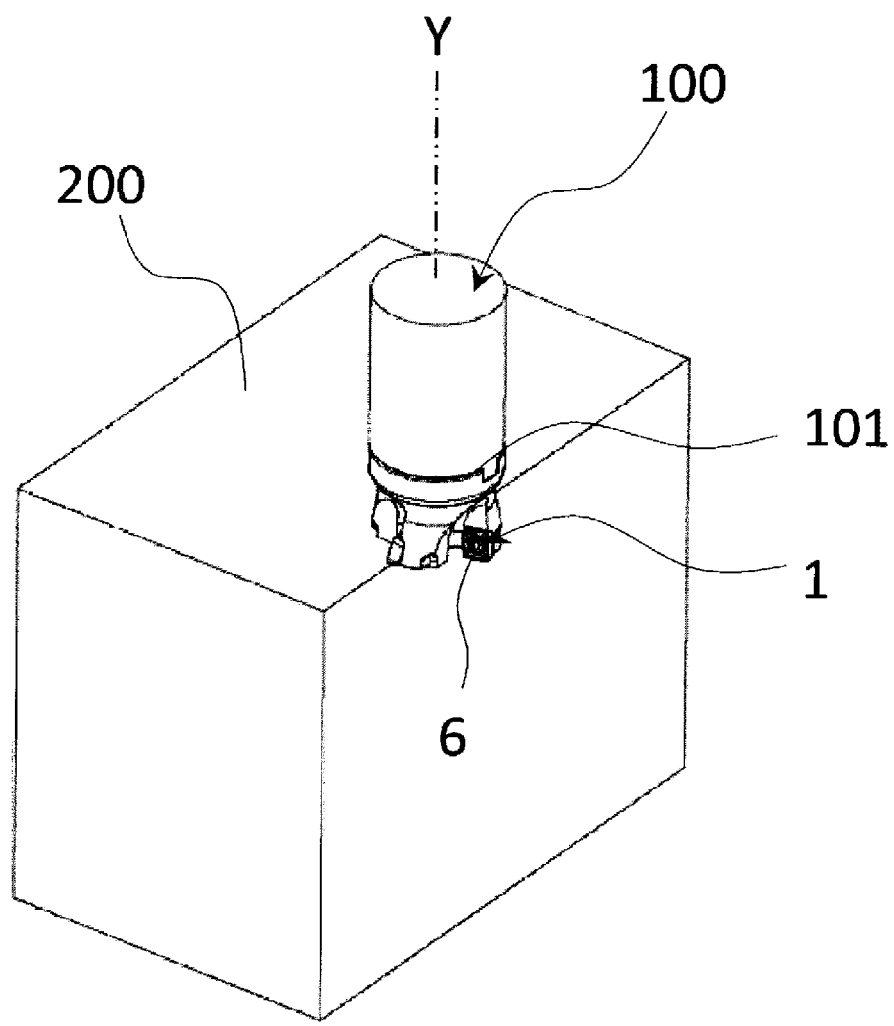
FIG. 13 is a perspective diagram illustrating one step in a method for manufacturing a cut workpiece of one embodiment of the present invention.
Figure 14:
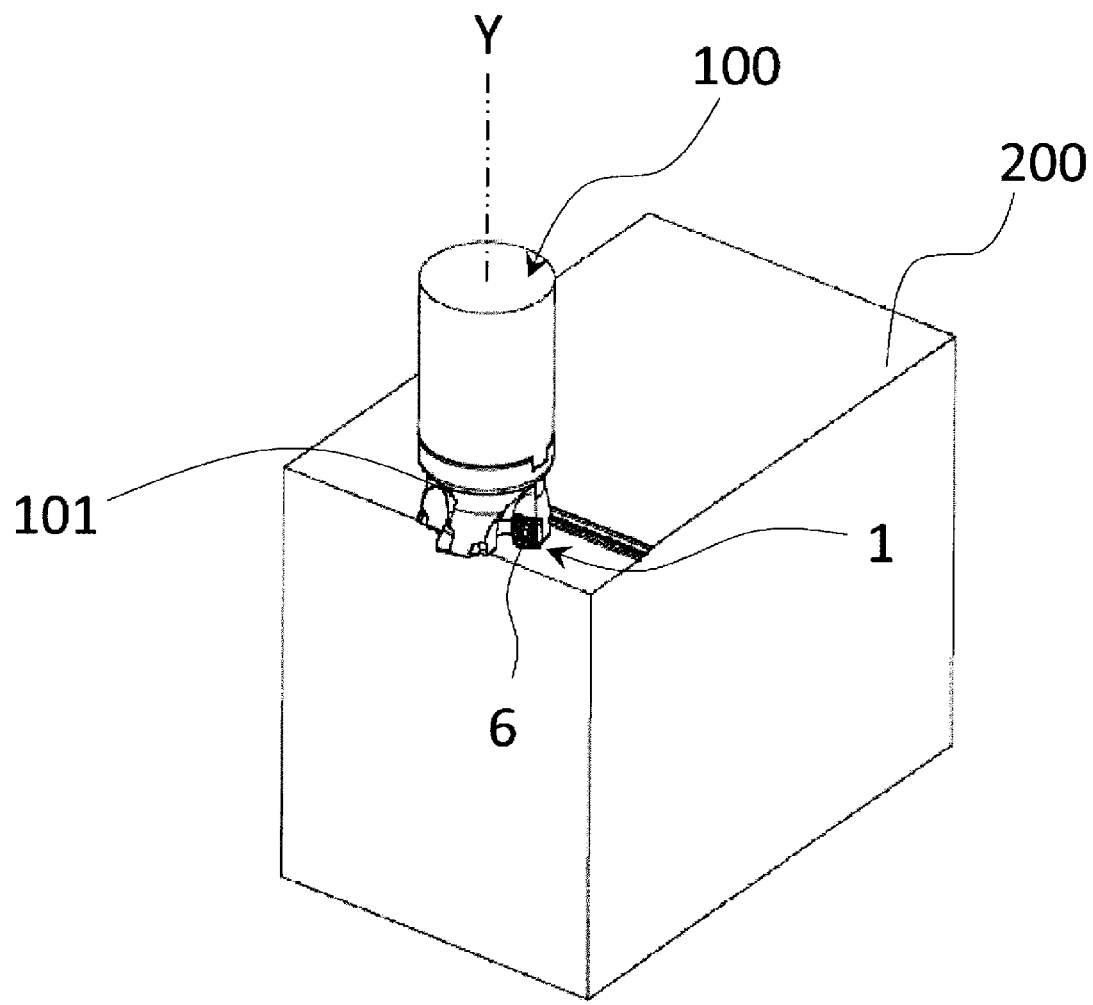
FIG. 14 is a perspective diagram illustrating one step of the method for manufacturing a cut workpiece of one embodiment of the present invention.
Figure 15:
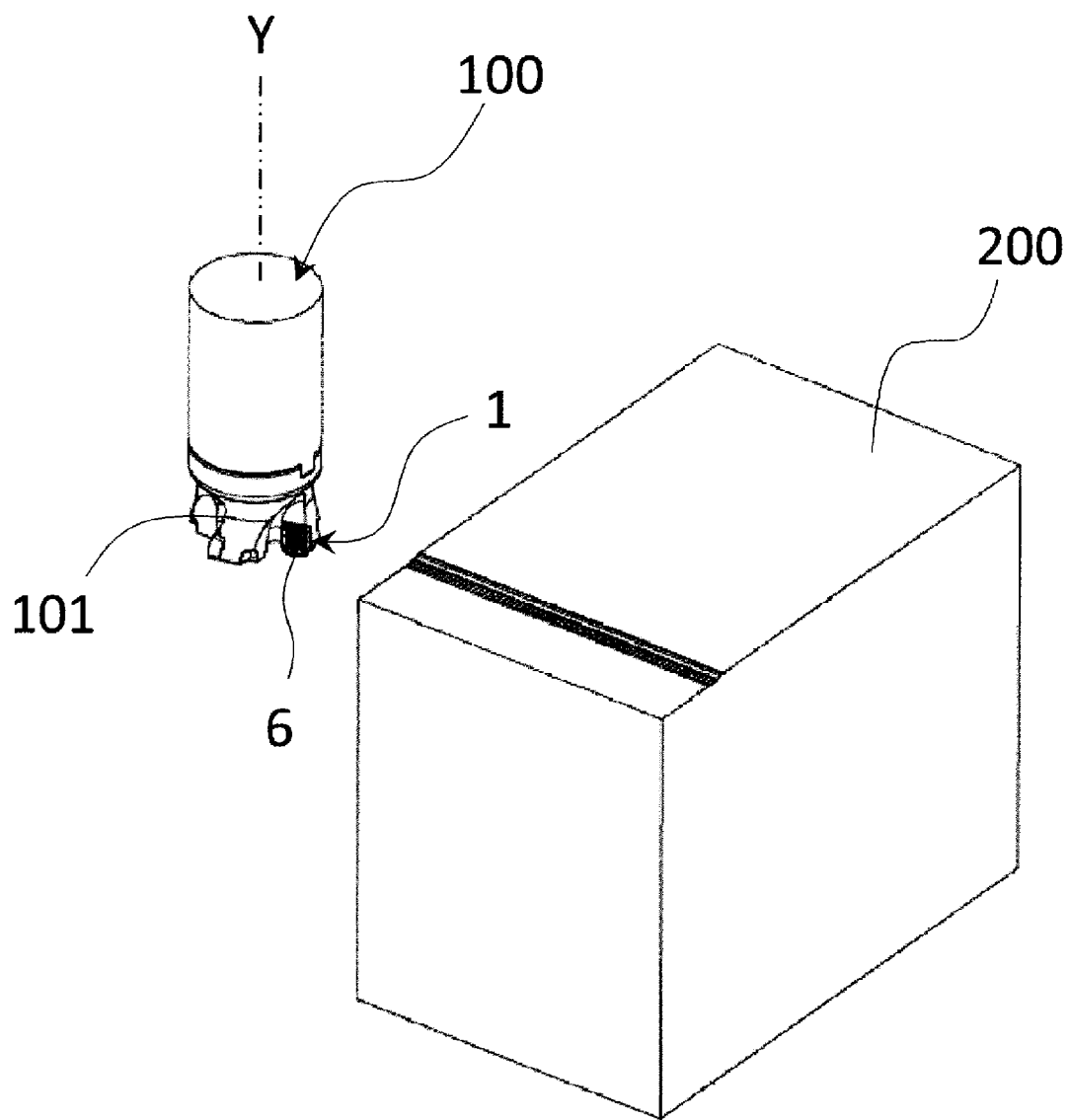
FIG. 15 is a perspective diagram illustrating one step of the method for manufacturing a cut workpiece of one embodiment of the present invention.

Next, description will be given of a method for manufacturing a cut workpiece of one embodiment of the present invention using FIGS. 13 to 15. FIGS. 13 to 15 illustrate a method for manufacturing a cut workpiece. Here, the broken lines in FIGS. 13 to 15 illustrate the rotation center axis Y of the cutting tool 100. The cut workpiece is manufactured by carrying out cut processing on the work material. The cutting method in the present embodiment is provided with the following steps. That is, (1) rotating the cutting tool 100 represented in the embodiment described above, (2) bringing the main cutting edge 6 in the rotating cutting tool 100 into contact with the work material 200, and (3) moving the cutting tool 100 away from the work material 200, are provided.

More specifically, first, the cutting tool 100 is brought relatively close to the work material 200 while being rotated about the rotation center axis Y. Next, as illustrated in FIGS. 13 and 14, the main cutting edge 6 of the cutting tool 100 is brought into contact with the work material 200 to cut the work material 200. Then, as illustrated in FIG. 15, the cutting tool 100 is moved away relative to the work material 200.

In the present embodiment, the work material 200 is fixed and the cutting tool 100 is brought to be close to the work material 200. In addition, in FIGS. 13 and 14, the work material 200 is fixed and the cutting tool 100 is rotated about the rotation center axis Y. In addition, in FIG. 15, the work material 200 is fixed and the cutting tool 100 is moved away. Here, in the cut processing in the method of the present embodiment, in each of these steps, the work material 200 is fixed and the cutting tool 100 is moved; however, the present invention is of course not limited thereto.

For example, in step (1), the work material 200 may be brought close to the cutting tool 100. In the same manner, in step (3), the work material 200 may be moved away from the cutting tool 100. In a case where the cut processing is to be continued, steps of bringing the main cutting edge 6 of the insert 1 into contact with different places on the work material 200 may be repeated by maintaining the rotating state of the cutting tool 100. When the main cutting edge 6 being used is worn, an unused main cutting edge 6 may be used by rotating the insert 1 90° with respect to the center axis of the through-hole. Here, representative examples of the material of the work material 200 include carbon steel, alloy steel, stainless steel, cast iron, non-ferrous metals, or the like.

REFERENCE SIGNS LIST 1, 1x, 10 Cutting insert (insert)
2, 2x Lower surface
3, 3x Upper surface
31 Land surface
32 Rake face
33 Flat surface
4, 4x Lateral surface
41 Flat part
42 Curved portion
5, 5x Corner cutting edge
5a, 5ax First corner cutting edge
5b, 5bx Second corner cutting edge
6, 6x Main cutting edge
61, 61x Curving portion
62 Linear portion
62a, 62ax First linear portion
62b, 62bx Second linear portion
63 Top portion
64 Bent part
100 Cutting tool
101 Holder
102 Insert pocket (pocket)
103 Screw
200 Work material
S End surface
e1 Ridge
H Through-hole
X Center axis
Y Rotation center axis
L Virtual plane
P Center of main cutting edge

The invention claimed is:

1. A cutting insert comprising:
an upper surface with a polygonal shape comprising:
a first corner which is contiguous to a machined surface of a work material during cutting of the work material;
a second corner; and
an edge located between the first corner and the second corner;
a lower surface with a polygonal shape located opposite to the upper surface;
a lateral surface provided between the lower surface and the upper surface, and comprising:
a first curved part having a curved shape;
a second curved part having a curved shape; and
a flat part having a flat shape;
a first corner cutting edge located at the first corner and connected to the first curved part;
a second corner cutting edge located at the second corner and connected to the second curved part; and
a main cutting edge located in the edge and connected to the flat part, wherein
the main cutting edge is upwardly convex in shape and comprises:
an upwardly convex curving portion;
a first linear portion extending from the curving portion toward the first corner cutting edge; and
a second linear portion extending from the curving portion toward the second corner cutting edge, and
a top portion of the curving portion is closer to the first corner than the second corner.

2. The cutting insert according to claim 1, wherein the curving portion has an arc shape in a side view.

3. The cutting insert according to claim 1, wherein the second linear portion is longer than the first linear portion.

4. The cutting insert according to claim 3, wherein an inclination angle of the first linear portion with respect to a virtual plane perpendicular to a center axis connecting a center of the upper surface and a center of the lower surface is greater than an inclination angle of the second linear portion with respect to the virtual plane in a side view.

5. The cutting insert according to claim 1, wherein the main cutting edge further comprises a downwardly concave bent part in a side view located between the second linear portion and the second corner cutting edge.

6. The cutting insert according to claim 5, wherein in the main cutting edge, the bent part is recessed toward the center of the upper surface in a top view.

7. A cutting tool comprising:
a holder comprising a plurality of insert pockets on a leading end side; and
the cutting insert described claim 1, which is mounted in the insert pockets such that the main cutting edge protrudes from the holder.

8. A method for manufacturing a cut workpiece, the method comprising the steps of:
rotating the cutting tool described in claim 7;
bringing the main cutting edge in the rotating cutting tool into contact with a work material; and
separating the cutting tool from the work material.

9. The cutting insert according to claim 1, wherein the first corner cutting edge has a downwardly concave curved shape in a side view.

* * * * *